US012148557B2

(12) United States Patent
Schulze et al.

(10) Patent No.: US 12,148,557 B2
(45) Date of Patent: Nov. 19, 2024

(54) MAGNETIC ASSEMBLY

(71) Applicant: Vacuumschmelze GmbH & Co. KG, Hanau (DE)

(72) Inventors: Axel Schulze, Darmstadt (DE); Sebastian Steigerwald, Westerngrund (DE)

(73) Assignee: Vacuumschmelze GmbH & Co. KG, Hanau (DE)

( * ) Notice: Subject to any disclaimer, the term of this patent is extended or adjusted under 35 U.S.C. 154(b) by 701 days.

(21) Appl. No.: 16/982,718

(22) PCT Filed: Mar. 20, 2019

(86) PCT No.: PCT/EP2019/057001
§ 371 (c)(1),
(2) Date: Sep. 21, 2020

(87) PCT Pub. No.: WO2019/180099
PCT Pub. Date: Sep. 26, 2019

(65) Prior Publication Data

US 2021/0005374 A1 Jan. 7, 2021

(30) Foreign Application Priority Data

Mar. 20, 2018 (DE) ........................ 102018106449.7

(51) Int. Cl.
*H01F 27/02* (2006.01)
*H01F 27/25* (2006.01)

(52) U.S. Cl.
CPC ............ *H01F 27/02* (2013.01); *H01F 27/25* (2013.01)

(58) Field of Classification Search
CPC .......... H01F 27/02; H01F 27/25; H01F 30/16; H01F 27/324; H01F 27/263; H01F 3/04
See application file for complete search history.

(56) References Cited

U.S. PATENT DOCUMENTS 4,646,803 A 3/1987 Kawanishi et al.

FOREIGN PATENT DOCUMENTS

| | | | | |
|---|---|---|---|---|
| DE | 10042573 A1 * | 2/2002 | .......... | H01F 17/062 |
| DE | 102012201002 A1 | 7/2013 | | |
| DE | 102015210854 A1 | 6/2019 | | |
| FR | 2721137 A1 | 12/1995 | | |

OTHER PUBLICATIONS

International Search Report with Written Opinion with translation regarding related Application PCT/EP2019/057001 dated Jun. 21, 2019.

* cited by examiner

*Primary Examiner* — Tuyen T Nguyen
(74) *Attorney, Agent, or Firm* — Dickinson Wright PLLC

(57) ABSTRACT

The invention relates to a magnetic assembly comprising a magnetic core made of a soft magnetic material and a housing which surrounds the magnetic core on all sides and has two housing parts connected to one another. The connected housing parts have an overlapping region all around the magnetic core, within which one of the housing parts has a ridge all around the edge and the other housing part has a corresponding groove all around the edge, in which the rib interlockingly engages.

27 Claims, 11 Drawing Sheets

MAGNETIC ASSEMBLY

This application is a 371 national phase entry of PCT/EP2019/057001 filed on 20 Mar. 2019, which claims benefit of German Patent Application No. DE 10 2018 106 449.7, filed 20 Mar. 2018, the entire contents of which are incorporated herein by reference for all purposes.

TECHNICAL FIELD

This disclosure relates to a magnetic assembly.

BACKGROUND

For the encasement and enclosure of soft magnetic toroidal tape cores and to protect them against dirt and external physical effects, multipart housings, for example, are often used that may comprise, for example, a trough made of plastic and a trough cover to close it with. The troughs commonly used may be round, oval, rectangular or of any other basic shape and may be circular or completely flat. Connecting and securing the joined housing parts, individually or collectively, can be carried out using adhesive, clamp or latch connections When manufacturing inductive assemblies, a magnetic core in such a housing can be wound with wires of various thicknesses and with various numbers of coils. During certain manufacturing steps, such as the attachment of the wire coils, mechanical stress can be generated that may affect the stability of the shape and dimensions of joining partners, in this case of the trough and the trough cover. Deformations that arise during various manufacturing steps or from the material itself may make producing a gap-free connection between the trough and the trough cover difficult, as a result of which a reliable sealing off of the inner chamber of the trough that encases the magnetic core and that is enclosed by the walls of the trough and the trough cover against environmental influences can no longer be ensured.

To join the trough and the trough cover, a snap connection is often provided that extends circumferentially along the outer perimeter of the trough and along the inner perimeter of the trough cover. Winding wire onto the housed magnetic core can place considerable stress on this connection and lead to its partial or complete detachment. In particular in those embodiments of the housing that have a longitudinally extended basic shape, gaps may appear between the joined elements due to the employed materials or manufacturing techniques. The risk of gap formation is even greater when numerous connections are needed, as in the case of housings that comprise three or more parts, for example. Thus, the following disclosure is directed, inter alia, to improvements of the seal of the joined connections of inductive assemblies.

SUMMARY

Various embodiments of a magnetic assembly are described herein as well as further developments thereof.

In one embodiment, a magnetic assembly with a magnetic core made of soft magnetic material includes a housing comprised of two joined housing parts that encloses the magnetic core on all sides. The joined housing parts further comprise an overlap region extending around the magnetic core within which one of the housing parts comprises a circumferential rib and the other housing part comprises a circumferential groove with which the rib positively engages.

In accordance with a further embodiment, the assembly comprises a circular magnetic core and a circular housing that encloses the magnetic core on all sides and that comprises two joined housing parts. Each of the housing parts has a first overlap region extending around the circular magnetic core on the outside and a second overlap region extending around the circular magnetic core on the inside, wherein in both the first overlapping region, as well as in the second overlapping region, one of the housing parts has a circumferential rib and the other housing part has a corresponding circumferential groove that positively engages with the corresponding rib.

In accordance with a further embodiment, the assembly comprises a magnetic core made of soft magnetic tape material having a maximum tape thickness, as well as a housing that encloses the magnetic core on all sides and that comprises two joined housing parts. Each of the housing parts has an overlap region extending around the magnetic core in which one of the housing parts has a circumferential rib and the other housing part has a corresponding circumferential groove that positively engages with the rib. In the overlap region where the rib engages with the groove, a gap remains which is smaller than the maximum tape thickness of the tape material of the magnetic core.

BRIEF DESCRIPTION OF THE DRAWINGS

The invention will now be described in the following based on examples illustrated in the figures. The illustrations are not true to scale and the invention is not limited to the examples and aspects illustrated here. Instead importance is given to illustrating the underlying principles of the invention. In the figures, the same reference signs designate the same or similar components that have the same or similar functions.

FIG. 5 shows a perspective cross-section view of an alternative to the housing part shown in FIG. 3.

DETAILED DESCRIPTION

The (at least) two-part housings for magnetic cores described here provide a connection between housing parts such as, for example, a trough cover (cover) and a trough bottom part (trough) that allows for a nearly "particle-impermeable" joining between the joined parts, that is, between the housing parts. These housings allow for greater manufacturing tolerances of the individual housing parts such as, for example, an undesired bending of flat side walls, can absorb more mechanical stress from manufacturing processes such as, for example, the winding of the core, and reduce particle contamination that may occur, for example, when the cover is mounted on the trough. They also make a permanent and stable attachment of the housing parts to each other possible without the need to resort to auxiliary materials such as, for example, adhesive tapes, adhesives, screws, and so on. In this manner, none of the elements needed for fixating the joined parts need to protrude from or over either the trough or the cover.

Figure 1:
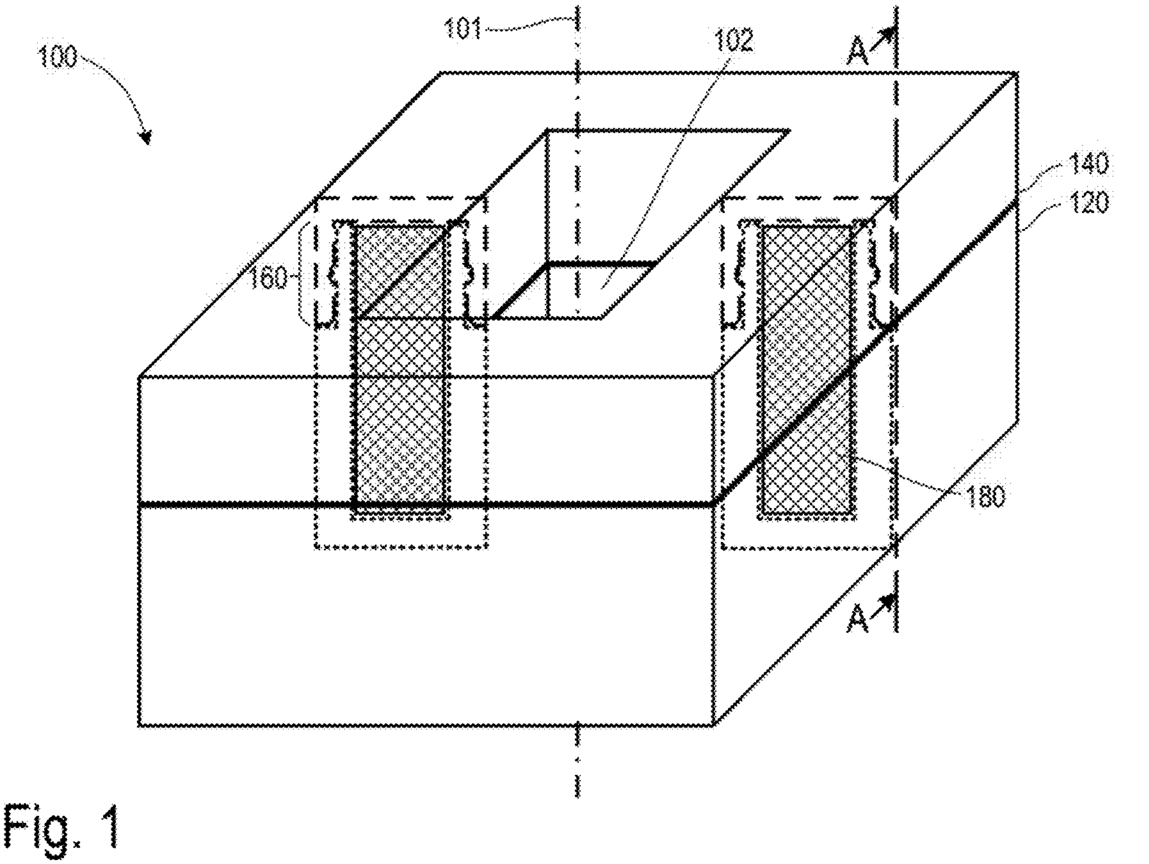
FIG. 1 shows a perspective view of a housing that is comprised of two joined housing parts and which has the shape of a rectangular ring.

Shown in FIG. 1 is a perspective view of an exemplary magnetic assembly that comprises a magnetic core 180 made of soft magnetic material and having the shape of a rectangular ring, as well as a corresponding housing 100 that encloses the magnetic core 180 from all sides. The housing 100 has the shape of a rectangular ring with a longitudinal axis 101 and (at least) one rectangular inner ring opening 102. The housing 100 is comprised of two housing parts 120 and 1450, each of which has an essentially U-shaped profile and which are joined together with a positive fit. The two housing parts 120 and 140 with the U-shaped profile thus enclose a chamber in which the magnetic core 180 is disposed. The housing 100 is area-symmetrical to a cross-section plane A-A. The cross sections of the housing parts 120 and 140 are designated in the cross-section plane A-A with a dashed line. The housing parts 120 and 140 are attached to each other along a circumferential (extending along an outer periphery of the housing) overlap region 160. In the overlap region 160 one of the housing parts 120 or 140 has a circumferential depression with a circumferential rib and the other has a circumferential groove, wherein the form of the rib is adapted to the form of the groove and thus corresponds to the form of the groove. When the housing parts 120 and 140 are assembled, the rib engages with the groove and the rib and the groove form a positive connection between the housing parts 120 and 140 that is, at least for particles, impermeable. The housing parts 120 and 140 can also be attached together along a circumferential overlap region 160' (extending around an inner periphery of the housing). In the overlap region 160' one of the housing parts 120 or 140 also has a circumferential depression with a circumferential rib and the other has a circumferential groove (similar to the overlap region 160).

Figure 2:
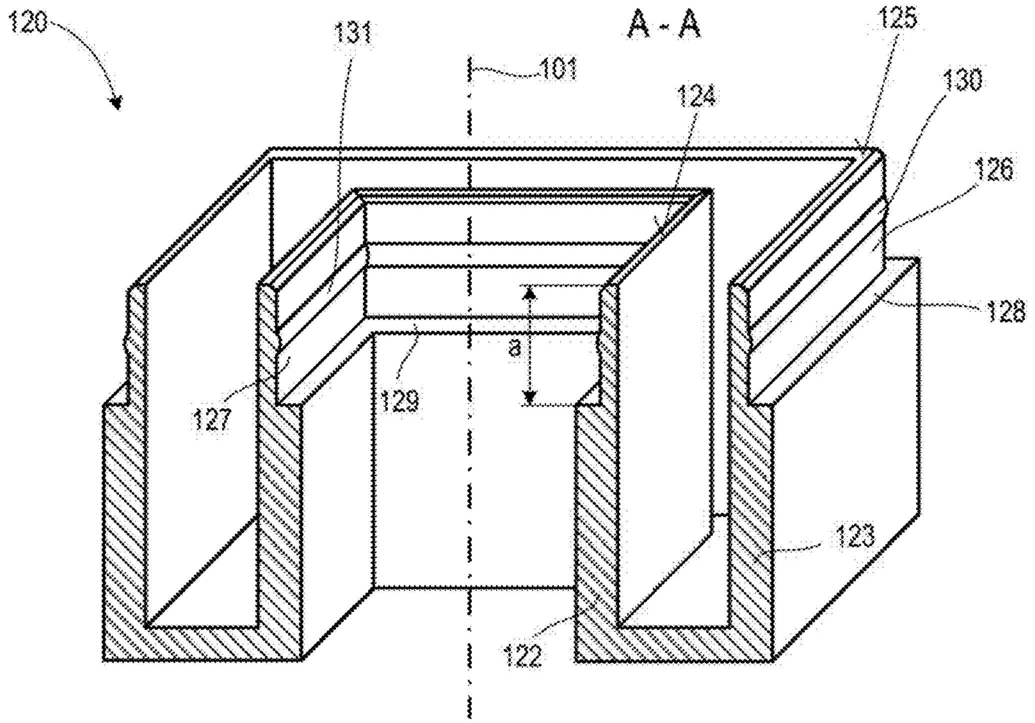
FIG. 2 shows a perspective cross-section view of a first housing part of the housing in accordance with FIG. 1.

FIG. 2 shows a perspective cross-section view of the housing part 120, referred to in the following as trough 120, wherein the cross-section plane A-A was selected for the cross-section view. The trough 120 has the shape, for example, of a rectangular, ring-shaped cup that is closed on three sides and open on a forth side. The basic shape of the cup is shown here as a rectangular ring, but may also have any other basic shape such as, for example, a round or oval basic shape. The trough 120 has an inner wall 122 and an outer wall 123. A circumferential depression 127 is incorporated on the sides of the inner wall 122 that face the opening 102. The circumferential depression 127 is on an upper end face 124 of the inner wall 122 and has the form, for example, of a step in the sides of the inner wall 122 that face the opening 120. The depression 127 extends parallel to the longitudinal axis 101 from the upper end face 124 of the trough 120 to a circumferential ledge 129 in the inner wall 122 of the trough 120.

The trough 120 also has a circumferential depression 126 on the sides of the outer wall 123 that face away from the opening 102. The circumferential depression 126 is incorporated in an upper end face 125 of the outer wall 123 in the form of a step on the sides of the outer wall 123 that face away from the opening 101 and extends parallel to the longitudinal axis 101 from the upper end face 125 to a circumferential ledge 128 in the outer wall 123 of the trough 120. In the region of each depression 127 and 128, the trough 120 has a circumferential rib 130 and 131 in the form of a part of a circular cylinder that has been divided lengthwise. The circumferential rib 130 and 131 extends along the circumferential direction of the longitudinal axis 101. The two circumferential ribs 130 and 131 lie in a plane that lies vertical to the longitudinal axis 101 and extends, for example, at half the height a of the depression 126.

Figure 3:
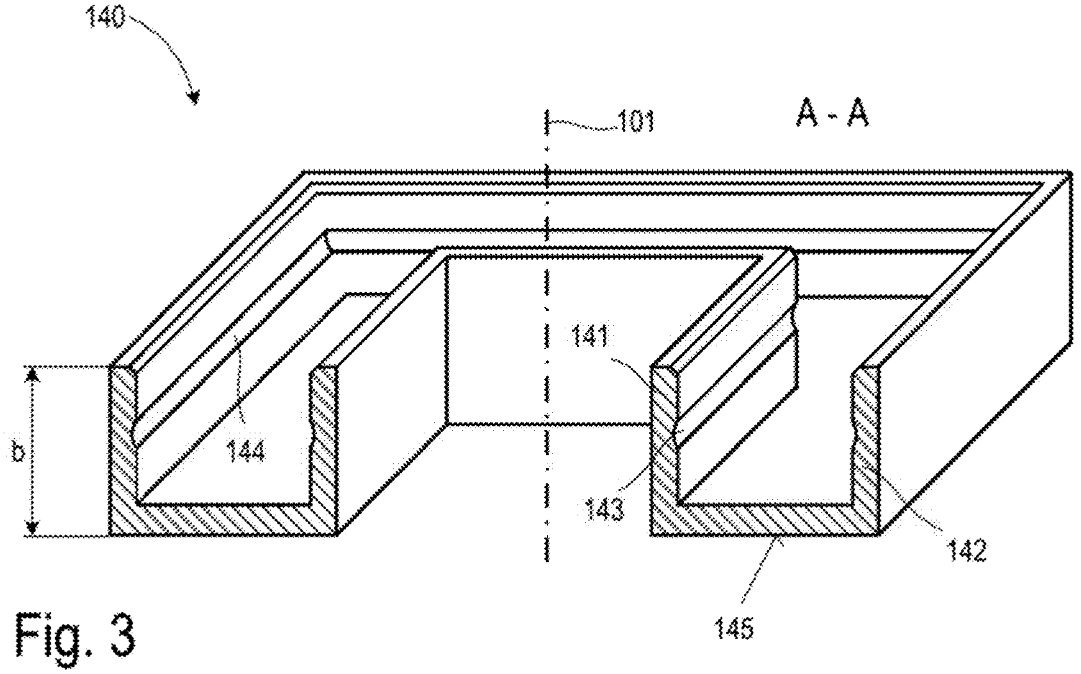
FIG. 3 shows a perspective cross-section view of a second housing part of the housing in accordance with FIG. 1.

FIG. 3 shows a perspective cross-section view of the housing part 140, hereinafter referred to as trough cover 140, wherein again the cross-section plane A-A was selected for the cross-section view. The trough cover 140 has the basic shape of a ring-shaped cup that is closed on an upper side 145 and that encloses an opening 102. The basic shape of the cup is rectangular, in view of the corresponding housing part 120, but can have any other suitable shape, depending on the shape of the housing part 120. The trough cover 140 has an inner wall 141 and an outer wall 142, wherein both the inner and outer walls 141 and 142 each have sides that face the opening 102 and each have sides that face away from the opening 102. In the example shown here, that is in a housing that has the basic shape of a rectangular ring, the inner and the outer walls 141 and 142 each have four such sides. A circumferential groove is incorporated in both the sides of the inner wall 141 that face away from the opening 102, as well as in the sides of the outer wall 142 that face the opening 102. Both circumferential grooves 143 and 144 lie, for example, in one plane which lies vertically on the longitudinal axis 101 and extend, for example, at half the height b of the trough cover 140. Each of the circumferential grooves 143 and 144 have roughly the shape of a circular cylinder, divided in half along its longitudinal axis.

Figure 4:
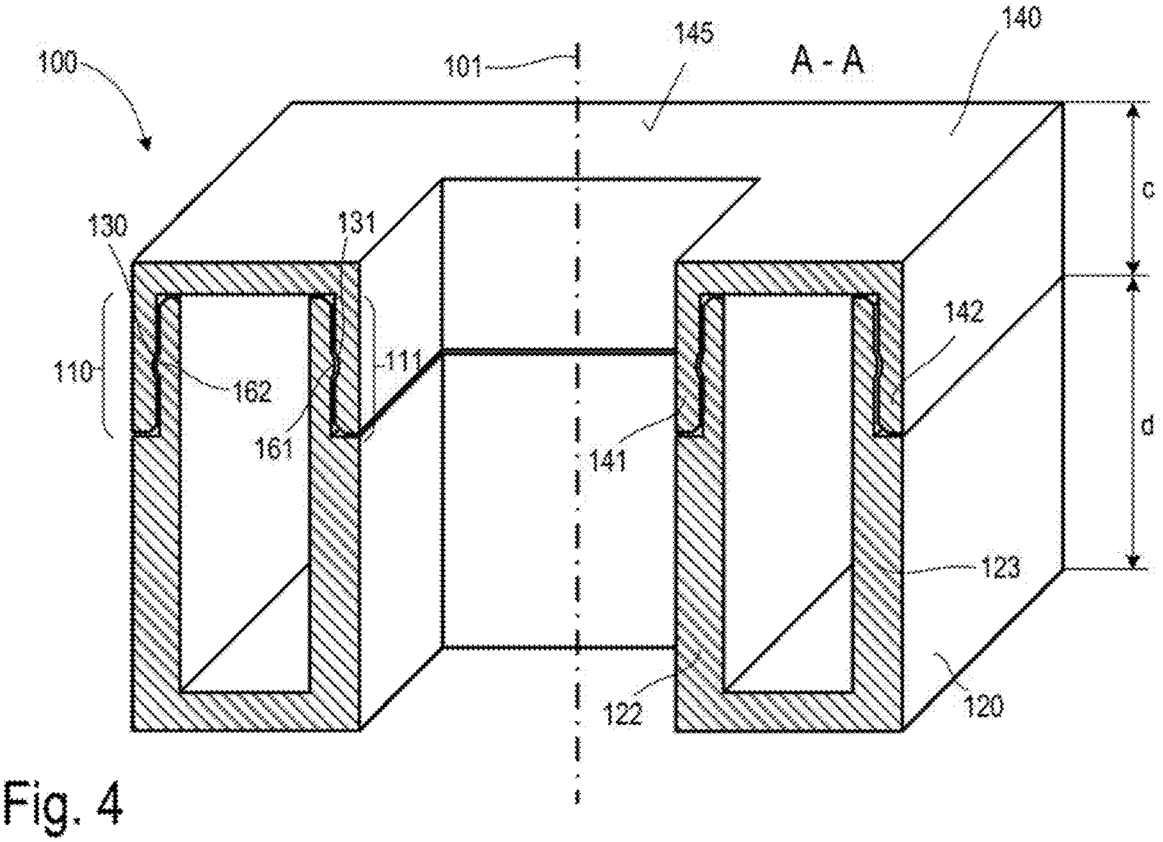
FIG. 4 shows a perspective cross-section view of the housing in accordance with FIG. 1.

FIG. 4 shows a perspective cross-section view of the housing 100, wherein the cross section plane A-A was selected for the cross-section view. The housing 100 is composed of the trough 120 and the trough cover 140. The trough cover 140 is disposed on the trough 120 or is inserted in the trough 120 or is fitted over the trough 120. In the example shown here the trough cover 140 is fitted over the trough 120 such that the inner wall 141 and the outer wall 142 of the trough cover 140 each extend to the circumferential ledges 128 and 129 of the trough 120 shown in FIG. 2. The trough cover 140 covers the top face ends 124 and 125 of the inner and outer walls 122 and 123 of the trough 120, as well as, at least partially, the circumferential depressions 126 and 127 (see also FIG. 2). The trough 120 and the trough cover 140 may have the same height, in which case the two heights c and d may have identical values. The edges of the trough 120 and of the trough cover 140, which extend parallel to the longitudinal axis 101, may be rounded. The reference numbers 110 and 111 designate the aforementioned overlap regions of the trough 120 and the cover 140 (in FIG. 1 designated as 160). In FIG. 4 the circumferential ribs 130 and 131 incorporated in the first overlap region 110 and in the second overlap region 111, as well as the corresponding grooves 144 and 143, with which the ribs 130 and 131 positively engage, are also shown in FIG. 4.

Figure 5:
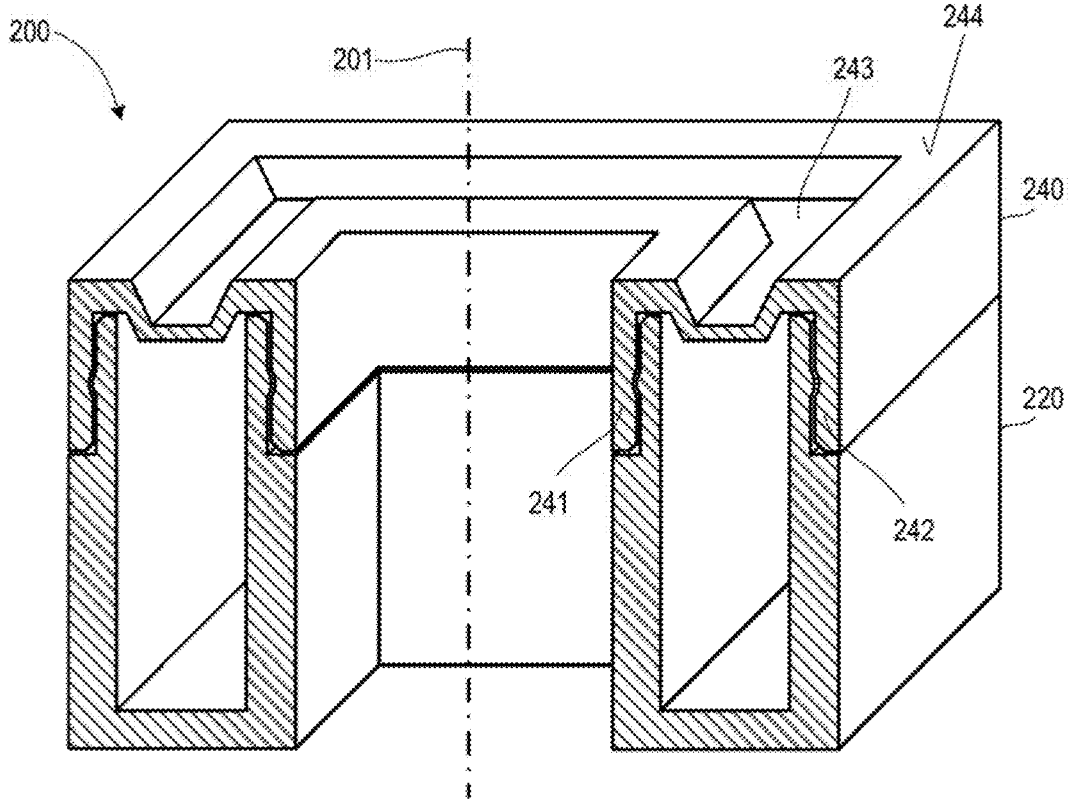
FIG. 5 shows a perspective cross-section view of an alternative to the housing part shown in FIG. 2.

FIG. 5 shows a perspective cross-section view of a housing 200, wherein a symmetrical plane of the housing 200 was chosen for the cross section plane. The housing 200 is composed of a trough 220 and of a trough cover 240. The trough 220 in this example is identical in construction to the through 120. The housing 200 differs from the housing 100 only in that the trough cover 240, as opposed to the trough cover 140, has an additional depression in the form of a circumferential corrugation 243. The corrugation 243 is disposed, for example, relatively close to an inner wall 241 and/or an outer wall 242 in order to provide (even) more resistance to radially occurring forces that arise, for example, during the winding of the housing and/or against deformations (such as, for example, the bending of a normally flat wall) that may come about during the manufacturing process (such as, for example, during the plastic injection molding of housing parts.

The corrugation 243 is incorporated in an upper side 244 of the trough cover 240 that connects an inner wall 241 to an outer wall 242 of the trough cover 240 and extends between the inner wall 241 and the outer wall 242 of the trough deckle 240. The corrugation 243 follows the course of a chamber enclosed by the trough 229 and the trough cover 240 and in which a magnetic core is disposed. The circumferential corrugation 243 is incorporated in the direction of a longitudinal axis 201 of the housing 200 and, in the example shown here, has the form of a depression in the direction of the longitudinal axis 201 (towards the inside of the housing), but could also be a protuberance (extending along the longitudinal axis 201 in the opposite direction). The circumferential protuberance may also be, for example, a circumferential elevation on the upper side 244 of the trough cover 240. The corrugation 243 can have the basic shape of a trapezoidal prism or it can have any other basic shape and may extend in the upper side 244 of the trough cover 240 around an opening 201 enclosed by the housing 200.

Figure 6:
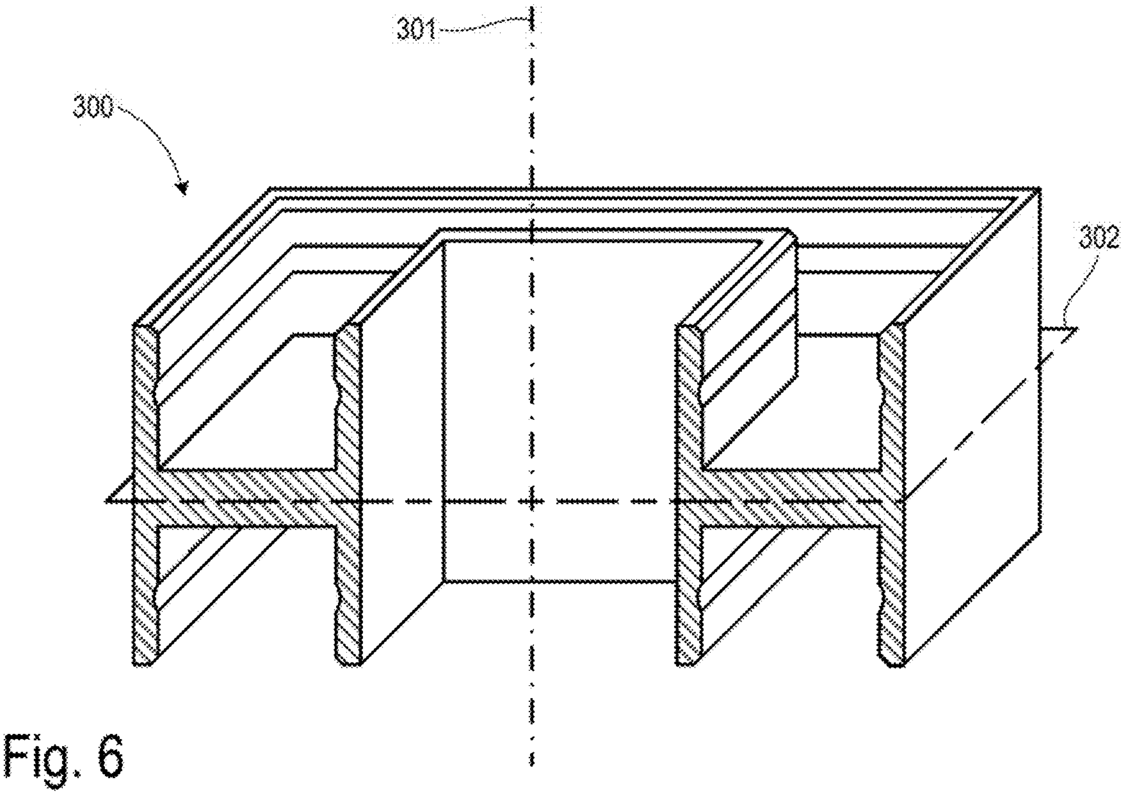

FIG. 6 shows a perspective cross-section view of a double trough cover 300, wherein a symmetrical plane of the double trough cover 300 in which a longitudinal axis 301 of the double trough cover 300 lies was chosen for the cross-section view. The double trough cover 300 is area symmetrical to a plane 302, wherein one of the symmetric halves is constructed identically to the trough cover 140. The plane 302 extends vertically to a longitudinal axis 301 and the double trough cover 300 is rotationally symmetrical to the longitudinal axis 301.

Figure 7:
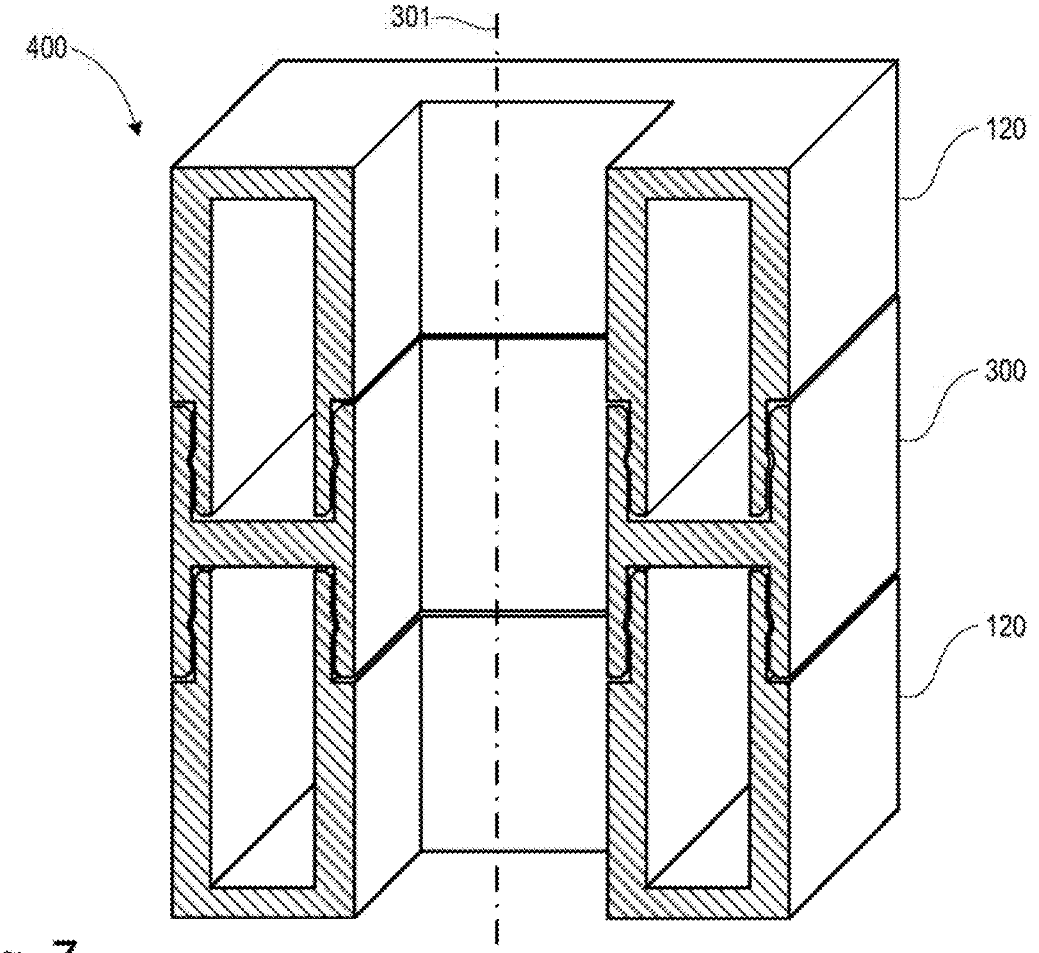
FIG. 7 shows a perspective cross-section view of a housing in the shape of a rectangular ring composed of three joined housing parts.

FIG. 7 shows a perspective cross-section view of a housing 400, wherein a symmetrical plane of the housing 400 in which the longitudinal axis 301 extends was selected for the cross-section view. The housing 400 is composed of a double trough cover 300, similar or identical to the double trough cover 300, of a first trough 302 and of a second trough 303, wherein the first trough 302 and the second trough 303 can be identical in construction to the trough 120 in accordance with FIG. 1. The trough cover 300 is connected to both the first trough 302, as well as to the second trough 303 and forms a connection piece between the first trough 302 and the second trough 303. When joining the trough cover 300 to the first trough 302 and to the second trough 303, the circumferential ribs of the troughs 302, 303 engage with the circumferential grooves of the trough cover 300, forming a positive connection between the trough cover 300 and the first trough 302, as well as between the trough cover 300 and the second trough 303.

Figure 8:
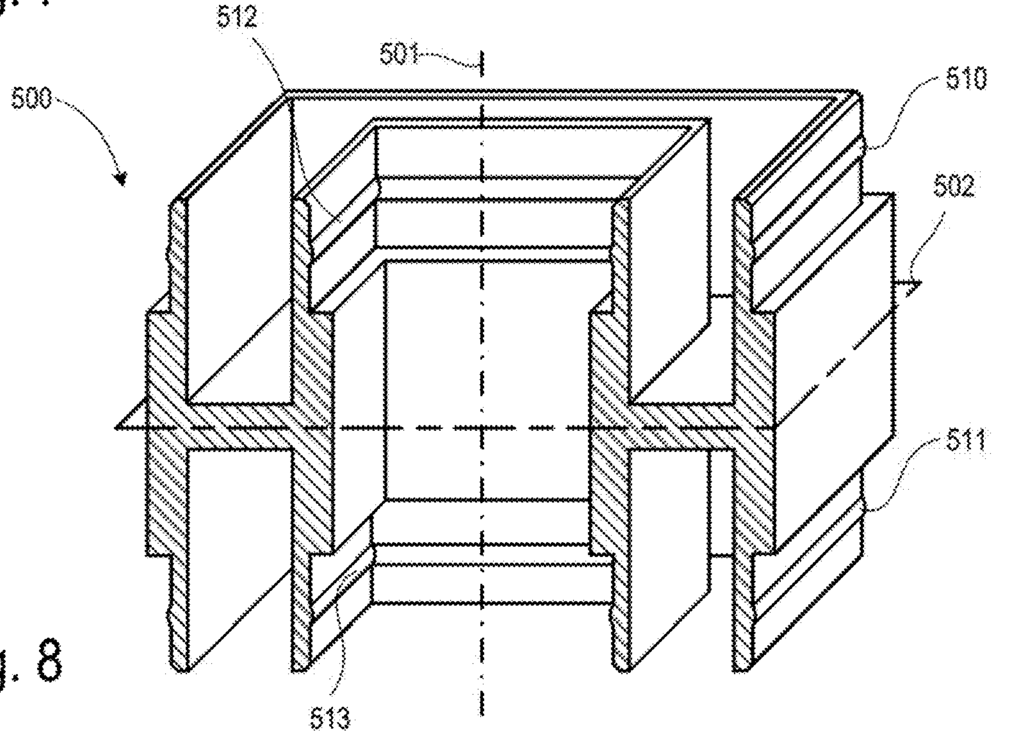
FIG. 8 shows a perspective cross-section view of an alternative to the first housing part shown in FIG. 2.

FIG. 8 shows a perspective cross-section view of a trough 500, wherein a symmetrical plane of the trough 500 in which a longitudinal axis 501 of the trough extends was selected for the cross-section view. The trough 500 is area symmetric to a plane 502, wherein each of the symmetric halves is of an identical construction to that of the trough 120. The plane 502 extends vertically to the longitudinal axis 501 and the trough is rotationally symmetric to the longitudinal axis 501.

Figure 9:
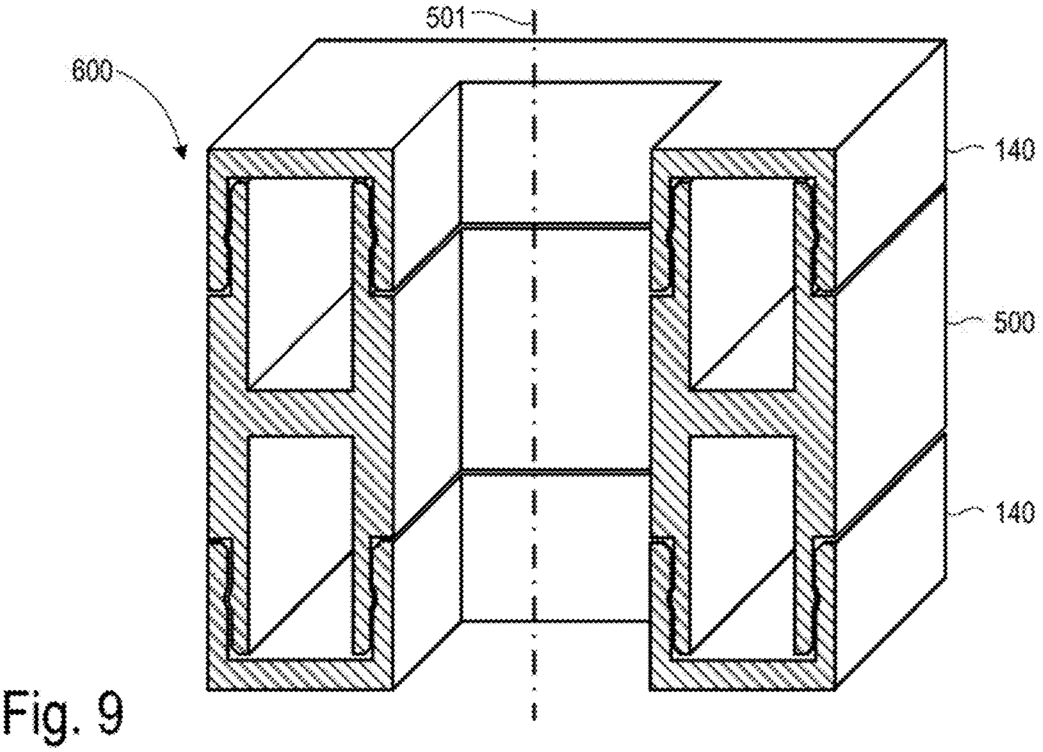
FIG. 9 shows a perspective cross-section view of an alternative to the housing composed of three housing parts shown in FIG. 7.

FIG. 9 shows a perspective cross-section view of a housing 600, wherein a symmetrical plain of the housing 600 in which a longitudinal axis 501 of the housing 600 extends was selected for the cross-section view. The housing 600 is composed of the trough 500, a first trough cover 601 and a second trough cover 602. Instead of the trough cover 601 and 602, which are constructed identically to the trough 140 in accordance with FIG. 1, two trough covers constructed identically to the trough cover 240 in accordance with FIG. 2 can also be used.

The trough 500 is connected both to the first trough cover 601, as well as to the second trough cover 602 and serves as a connection piece between the first trough cover 601 and the second trough cover 602. When joining the trough 500 to the first trough cover 601 and to the second trough cover 602, each of the circumferential ribs 130 and 131 of the trough covers 601, 602 engage with circumferential grooves 510, 511, 512 and 513 of the trough 500, forming a positive connection between the trough 500 and the first trough cover 601, as well as between the trough 500 and the second trough cover 602.

Figure 10:
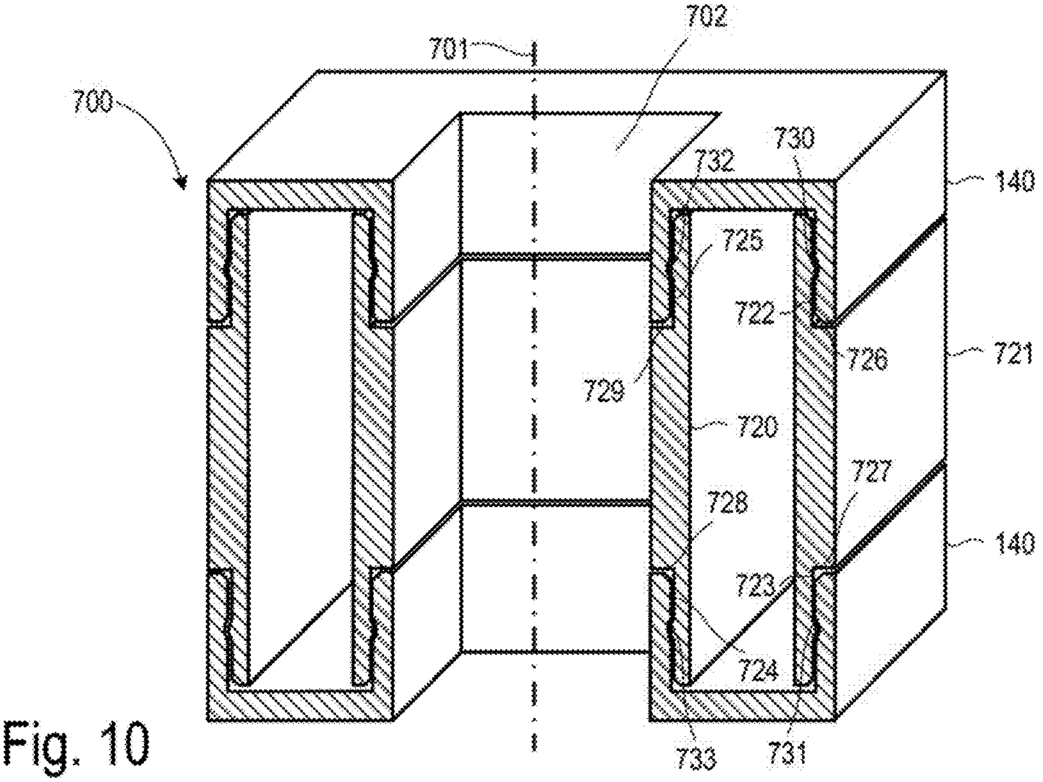
FIG. 10 shows a perspective cross-section view of an alternative to the housing composed of three housing parts shown in FIG. 9.

FIG. 10 shows a perspective cross-section view of an alternative housing 700 to the housing 600, wherein a symmetric plane of the housing 700 in which a longitudinal axis 701 of the housing 700 extends was selected for the cross-section view. The housing 700 is composed of an inner duct 720, an outer duct 721, the first trough cover 601 and the second trough cover 602 and it encloses an inner ring opening 702. In the example shown here, the inner and outer ducts 720 and 721 are both rectangular ducts, and thus the housing 700 has the shape of a rectangular ring. The inner duct 720 and the outer duct 721 each have a circumferential depression 722, 723, 724 and 725 at one of their ends that extends in the form of a step from each of these ends to a circumferential ledge 726, 727, 728 and 729. The circumferential depressions 724 and 725 are incorporated in the sides facing the opening 702 in the inner duct 720 and in the sides facing away from the opening 702 in the outer duct 721. The inner and outer ducts 720 and 721 each have a circumferential rib 730, 731, 732 and 733 in the region of the circumferential depressions 722, 723, 724 and 725. The two trough covers 601 and 602 are fitted over the inner and outer ducts 720 and 721 and each extend to the circumferential ledges 726, 727, 728 and 729. The circumferential ribs 730, 731, 732 and 733 of the inner and outer ducts 720 and 721 engage with the grooves 143 and 144 of the two trough covers 601 and 602, positively connecting the inner duct 720 and the outer duct 721 to the respective trough covers 601 and 602.

Figure 11:
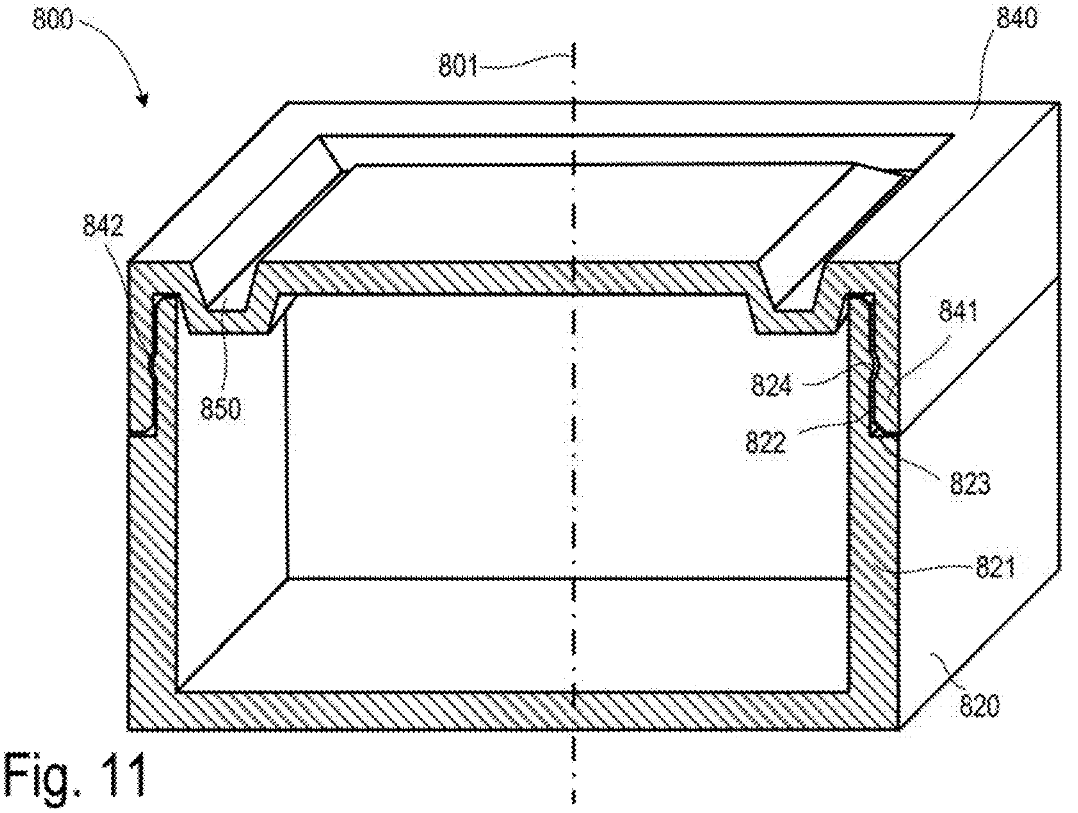
FIG. 11 shows a perspective cross-section view of a housing for accommodating a cuboid magnetic core.

FIG. 11 shows a perspective cross-section view of an alternative housing 800 to the housing 100 shown in FIG. 4. A symmetric plane of the housing 800 in which a longitudinal axis 801 lies to which the housing 800 is rotationally symmetric was selected for the cross-section view. As opposed to the housing 100, the housing 800 comprises a cup-shaped trough 820 and a cup-shaped trough cover 840. The housing 800 has the basic shape of a cube and encloses a chamber in which, for example, a cube-shaped or rod-shaped magnetic core is housed.

The trough 820 has a wall 821 that has a circumferential depression 822 on an end facing away from the bottom of the trough 820. The circumferential depression 822 is incorporated, in the form of a step, in each side of the wall 821 that faces away from the chamber. The circumferential depression 822 extends from an end face of the trough 820 that faces away from the bottom and parallel to the longitudinal axis 801 to a circumferential ledge 823 in the wall 821 of the trough 800. The trough 800 has, in the region of the depression 822, a circumferential rib 824 in the shape of a circular cylinder that has been divided along its longitudinal axis. The rib 824 extends in a plane that lies vertical to the longitudinal axis 801.

The trough cover 840 has a wall 841 that has a circumferential groove 842 in its sides that face the chamber. The circumferential groove 842 lies in a plane that lies vertical to the longitudinal axis 801 and has the shape of a circular cylinder that has been divided along its longitudinal axis. In the example shown here, the trough cover 840 is fitted over the trough 820 such that the trough cover 840 extends to the circumferential ledge 823 of the trough 820. The circumferential rib 824 in the trough 820 engages with the circumferential groove 842 in the trough cover 840 and thus the trough 820 and the trough cover 840 are positively connected to each other. The trough cover 840 may also have a corrugation 850 which, in the present example, is disposed in the bottom of the cover in the form of a rectangular ring-shaped depression and as close to the side walls as possible.

Figure 12:
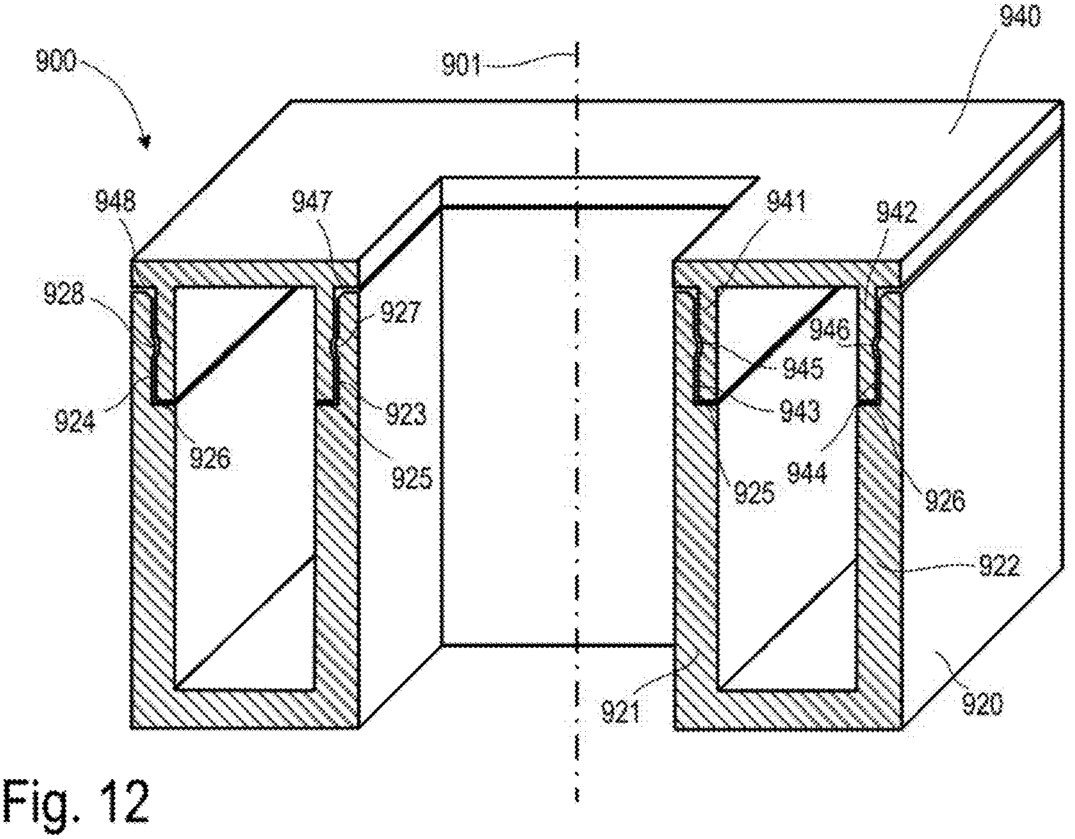
FIG. 12 shows a perspective view of an alternative to the housing shown in FIG. 4.

FIG. 12 shows a perspective cross-section view of a housing 900, wherein a symmetrical plane of the housing 900 was selected for the cross-section view. A longitudinal axis 901 of the housing, relative to which the housing 900 is rotationally symmetric, lies in this symmetric plane. The housing 900 has the basic shape of a rectangular ring, encloses a ring opening and is composed of a trough 920 and of a trough cover 940. The trough 920 has an inner wall 921 and an outer wall 922. A circumferential depression 923 and 924 is incorporated in the sides of the inner wall 921 that face away from the inner ring opening, as well as in the sides of the outer wall 922 that face the inner ring opening. The circumferential depressions 923 and 924 are incorporated in the form of steps in the inner wall 921 and in the outer wall 922 and both are delimited by a circumferential ledge 925 and 926. A circumferential rib 927 and 928 is incorporated in each of the circumferential depressions 923 and 924. The trough cover 940 also comprises an inner wall 941 and an outer wall 942. A circumferential depression 943 and 944 is incorporated, in both cases in the direction of the longitudinal axis 901, in each of the sides of the inner wall 941 that face the inner ring opening and in each of the sides of the outer wall 942 that face away from the inner ring opening. The circumferential depressions are in the form of steps and each is delimited by a circumferential ledge 947 and 948. A groove 945 and 946 is incorporated in each of these circumferential depressions 943 and 944.

The form of the grooves 945 and 946 corresponds to the form of the ribs 927 and 928 and the trough cover 940 is connected to the trough 920 in that the circumferential ribs 927 and 928 of the trough 920 engage with the circumferential grooves 945 and 946 of the trough cover 940, thereby positively connecting the trough 920 to the trough cover 940. In the example shown here, the trough cover 940 is inserted into the trough 920 and with each of the end faces 924 and 924. A circumferential, cube-shaped rib 925 and 926 extends on each of these end faces 923 and 924. The trough cover 940 has an underside 941 in which two circumferential and cube-shaped grooves 942 and 943 are incorporated. The grooves 942 and 943 are incorporated in the underside 941 such that, when the trough 920 is assembled, the trough 920 and the trough cover 940 enclose a chamber in which a magnetic core (not shown) is disposed. Although not explicitly shown here, the trough cover 940 may have a corrugation in this case as well.

Figure 13:
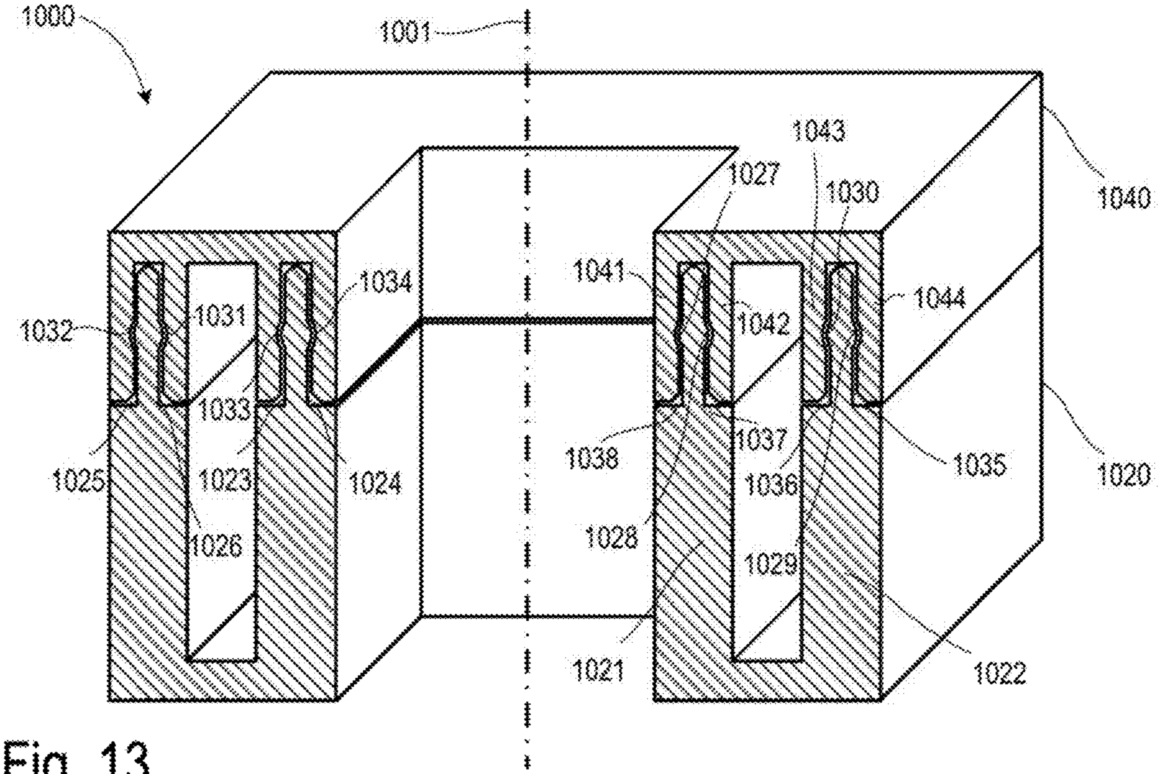
FIG. 13 shows a perspective cross-section view of a second alternative to the housing shown in FIG. 4.

FIG. 13 shows a perspective cross-section view of a housing 1000. A symmetric plane of the housing 1000 in which a longitudinal axis 1001 of the housing 1000 lies was selected for the cross-section plane of the cross-section view. The housing 1000 has the basic shape of a rectangular ring that encloses an opening and the housing 1000 is rotationally symmetrical to the longitudinal axis 1001. The housing 1000 is composed of a trough 1020 and of a trough cover 1040. The trough 1020 comprises an inner wall 1021 and an outer wall 1022 and is closed on a side facing away from the trough cover 1040 such that the trough 1020 and the trough cover 1040 enclose a chamber in which a magnetic core (not shown) is disposed. The trough 1020 has two circumferential recesses 1035, 1036, 1037 and 1038 in both its inner wall 1021, as well as in its outer wall 1022 on the side facing the trough cover 1040. The circumferential recesses 1035, 1036, 1037 and 1038 are incorporated in both the sides that face the opening, as well as in the sides that face away from the opening of both the inner wall 1021 and the outer wall 1022. Circumferential ribs 1027, 1028, 1029 and 1030 extend in the circumferential recesses 1035, 1036, 1037 and 1038, wherein the circumferential ribs 1027, 1028, 1029 and 1030 extend in a plane that lies vertical to the longitudinal axis 1001.

The trough cover 1040 has a first and a second inner wall 1041 and 1042, as well as a first and a second outer wall 1043 and 1044. The first inner wall 1041 and the first outer wall 1043 each have a circumferential groove 1031 and 1034 on the sides facing the opening. The second inner wall 1042 and the second outer wall 1044 each have a circumferential groove 1032 and 1033 on the sides facing the opening. The circumferential grooves 1031, 1032, 1033 and 1034 lie in the same plane as the circumferential ribs 1027, 1028, 1029 and 1030. In the example shown here, the circumferential grooves 1031, 1032, 1033 and 1034 have a form that corresponds to that of the circumferential ribs 1027, 1028, 1029 and 1030 and the circumferential ribs 1027, 1028, 1029 and 1030 each engage with one of the circumferential grooves 1031, 1032, 1033 and 1034, by means of which the trough 1020 and the trough cover 1040 are positively connected to each other. In an assembled state, the first and the second inner wall 1041 and 1042 and the first and second outer wall 1043 and 1044 extend to the ledges 1035, 1036, 1036 and 1038 in the inner wall 1021 and the outer wall 1022 of the trough 1020.

In addition to the basic shapes of a rectangular ring described here, the housings can have any other desired basic shape such as, for example, the basic shape of a round or flattened ring.

Figure 14:
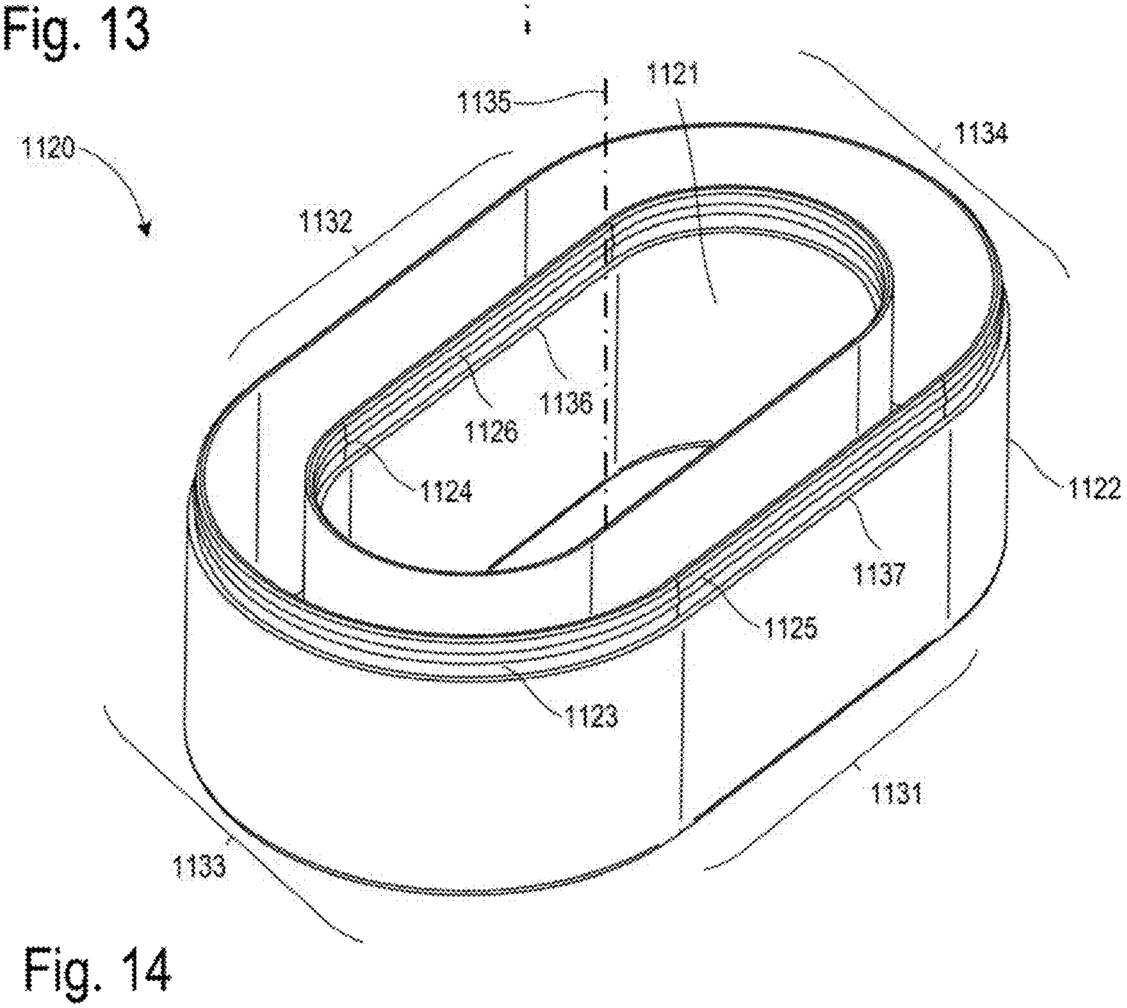
FIG. 14 shows a perspective view of a first housing part in the shape of a flattened ring.

FIG. 14 shows a perspective view of a trough 1120. The trough 1120 has the basic shape of a flattened ring that encloses an opening. The trough 1120 with the basic shape of a flattened ring has two oppositely disposed wall regions 1131 and 1132 that extend parallel to each other, as well as two further oppositely disposed wall regions 1133 and 1134 that extend parallel to a longitudinal axis 1001 and are shaped convexly in the direction facing away from the opening. The trough 1120 is double-counting rotationally symmetric to a longitudinal axis 1135 of the trough 1120. The trough 1120 has an inner wall 1121 and an outer wall 1122. A circumferential recess 1123 and 1124 is incorporated in each of the sides of the inner wall 1121 that face the opening and in each of the sides of the outer wall 1122 that face away from the opening. The circumferential recesses 1123 and 1124 are incorporated at the ends of the inner wall 1121 and the outer wall 1122 that are disposed oppositely to the underside. A circumferential rib 1125 and 1126 extends in each of the recesses 1123 and 1124, wherein the circumferential ribs 1125 and 1126 extend in a plane that lies vertical to the longitudinal axis 1135. The recesses 1123 and 1124 are incorporated in the inner wall 1121 and the outer wall 1122 in the form of steps and are delimited by a circumferential ledge 1136.

Figure 15:
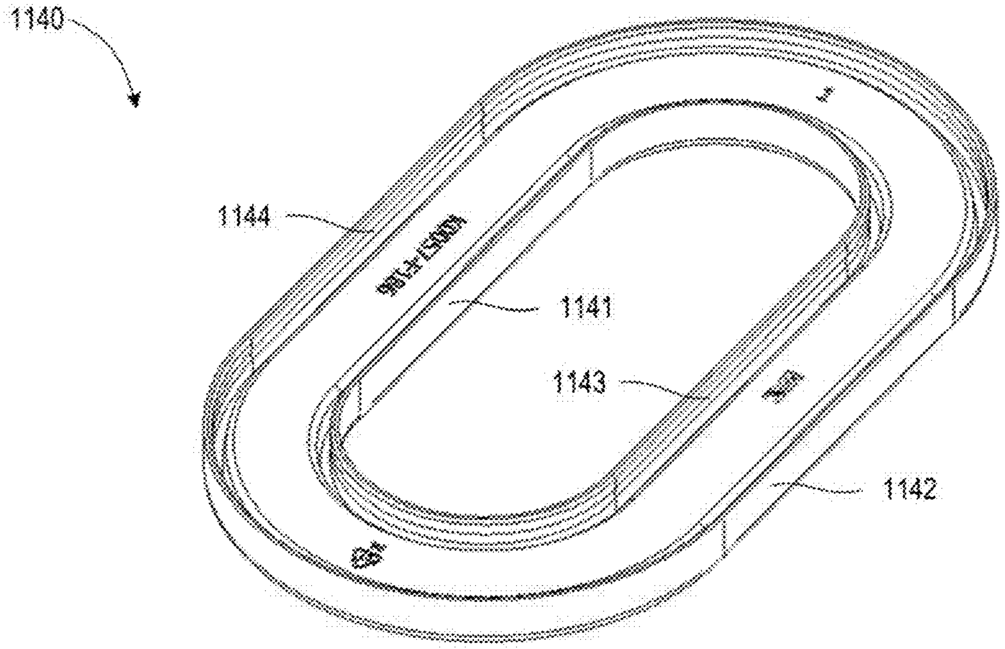
FIG. 15 shows a perspective view from below of a second housing part in the shape of a flattened ring with a circumferential corrugation.

FIG. 15 shows a perspective view from below of a trough cover 1140. The trough cover 1140 has a basic shape that is identical to the trough 1120, namely that of a flattened ring, and encloses an opening. The trough cover 1140 has an inner wall 1141 and an outer wall 1142, wherein the inner wall 1141, in the sides facing away from the opening, and the outer wall 1142, in the sides facing the opening, each have a circumferential groove 1143 and 1144. The circumferential grooves 1143 and 1144 have a form that corresponds to the form of the circumferential ribs 1125 and 1126 of the respective trough 1120. The trough 1120 can be closed with the trough cover 1140 such that the circumferential ribs 1125 and 1126 of the trough 1120 engage with the circumferential grooves 1143 and 1144 of the trough cover 1140, by means of which the trough 1120 and the trough cover 1140 are positively connected to each other, forming an assembled housing.

Figure 16:
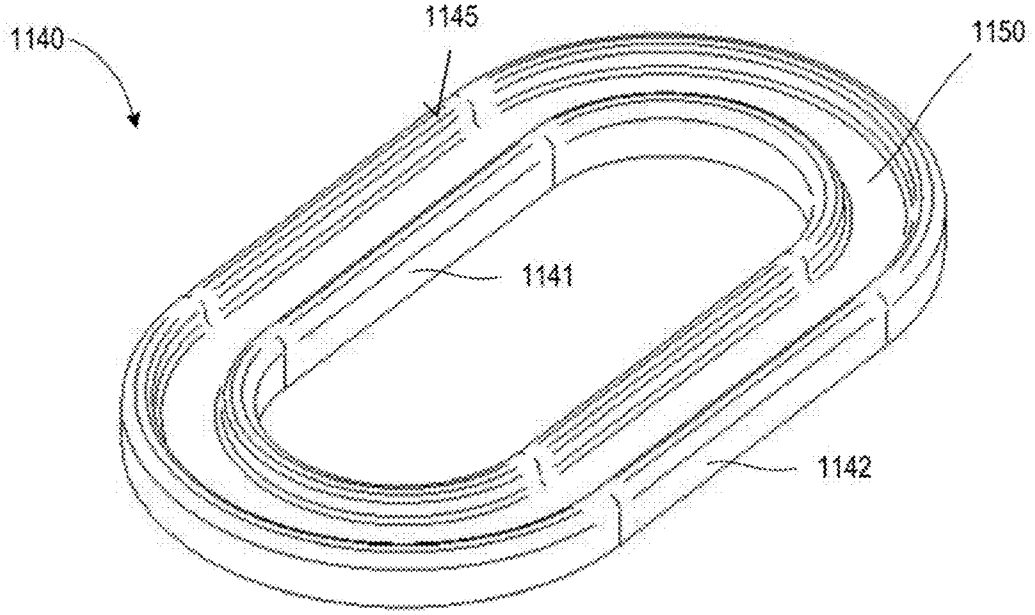
FIG. 16 shows a perspective view from above of the housing part in accordance with FIG. 15.

FIG. 16 shows a perspective view from above of the trough cover 1140. The trough cover 1140 has a circumferential corrugation 1150 incorporated in a topside 1145 of the trough cover 1140. The corrugation 1150 is incorporated in the direction of a longitudinal axis 1143 of the trough cover 1140. Instead of the corrugation 1150, the trough cover 1140 can have, as an alternative, a protuberance or an elevation, wherein the protuberance or elevation may have a progression similar to that of the corrugation 1150.

Figure 17:
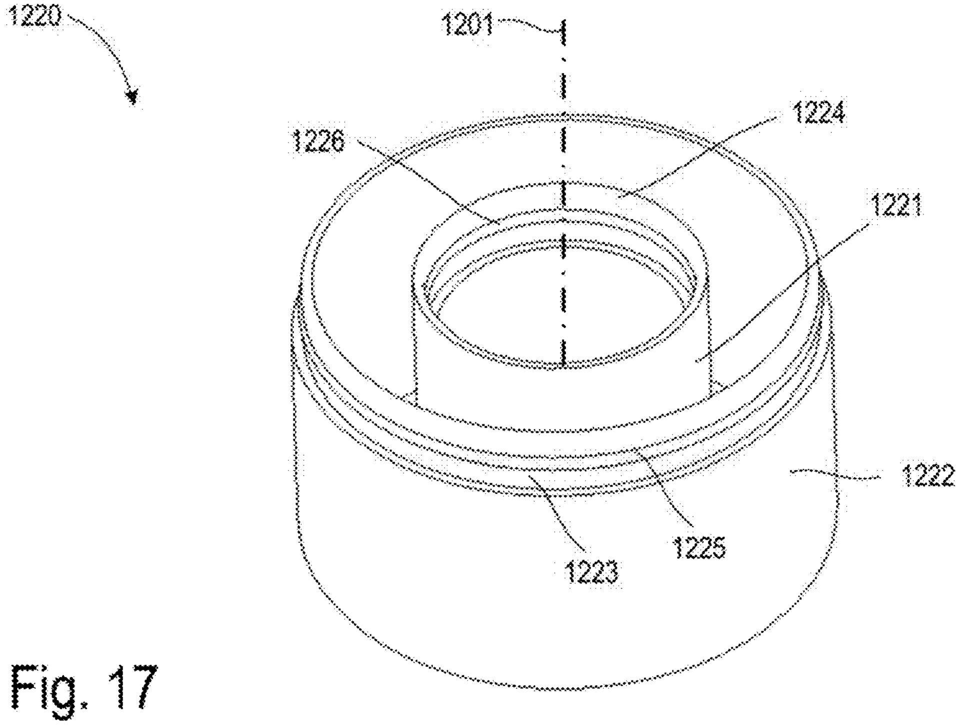
FIG. 17 shows a perspective view of a first housing part in the shape of a round ring.

FIG. 17 shows a perspective view of a trough 1220. The trough 1220 has the basic shape of a circular ring and encloses an inner ring opening. The trough 1220 is rotationally symmetric to a longitudinal axis 1201. The trough 1220 has an inner wall 1221 and an outer wall 1222. A circumferential recess 1223 and 1224 in the form of a step is incorporated both in the side of the inner wall 1221 that faces the inner ring opening, as well as in the side of the outer wall 1222 that faces away from the inner ring opening. Each of the recesses 1223 and 1224 are delimited in the direction of the longitudinal axis 1201 by a respective circumferential ledge 1227 and 1228. A circumferential rib 1225 and 1226 is incorporated each of the circumferential recesses 1223 and 1224, wherein the circumferential ribs 1225 and 1226 extend in a plane that lies vertical to the longitudinal axis 1201. A ring-shaped magnetic core 1230, wound, for example, with a soft magnetic tape, can be inserted into the trough 1220 such that, to begin with, the magnetic core 1230 is protected on three sides by the trough 1220.

Figure 18:
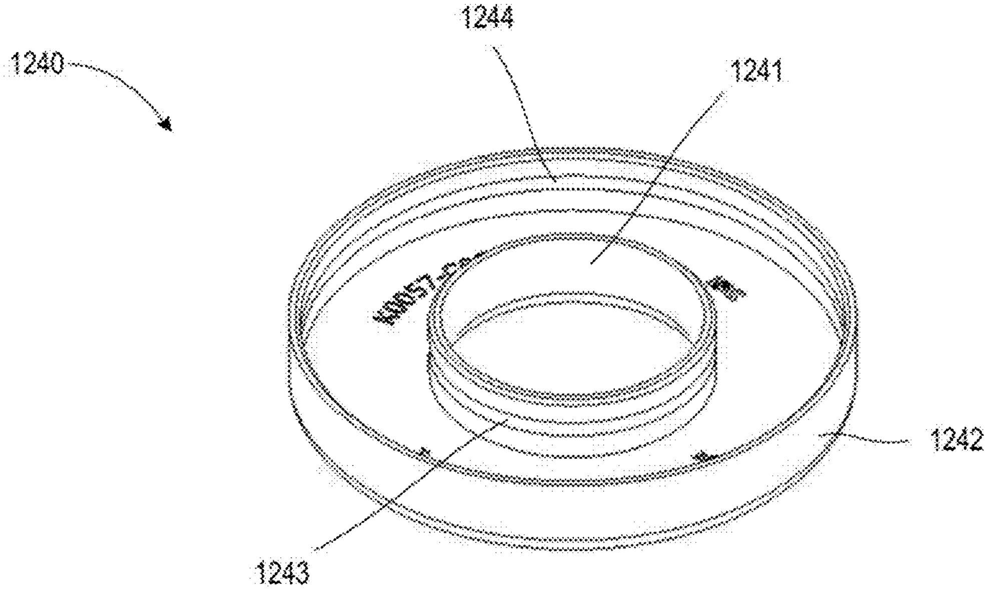
FIG. 18 show a perspective view from below of a second housing part in the shape of a round ring corresponding to the first housing part in accordance with FIG. 17.

FIG. 18 shows a perspective view of a trough cover 1240. The trough cover 1240 is rotationally symmetric to a longitudinal axis 1247 and has the basic shape of a circular ring that encloses an opening. The trough cover 1240 has an inner wall 1241 and an outer wall 1242. A circumferential groove 1243 and 1244 is provided on the side of the inner wall facing the opening and on the side of the outer wall facing away from the opening. The trough 1220 and the trough cover 1240 are constructed such that, when the trough 1220 is closed with the trough cover 1240, the circumferential ribs 1225 and 1226 engage with the circumferential grooves 1243 and 1244. Thus the trough 1220 and the trough cover 1240 are positively connected to each other, forming an assembled housing. With this, the magnetic core is protected on all sides.

Figure 19:
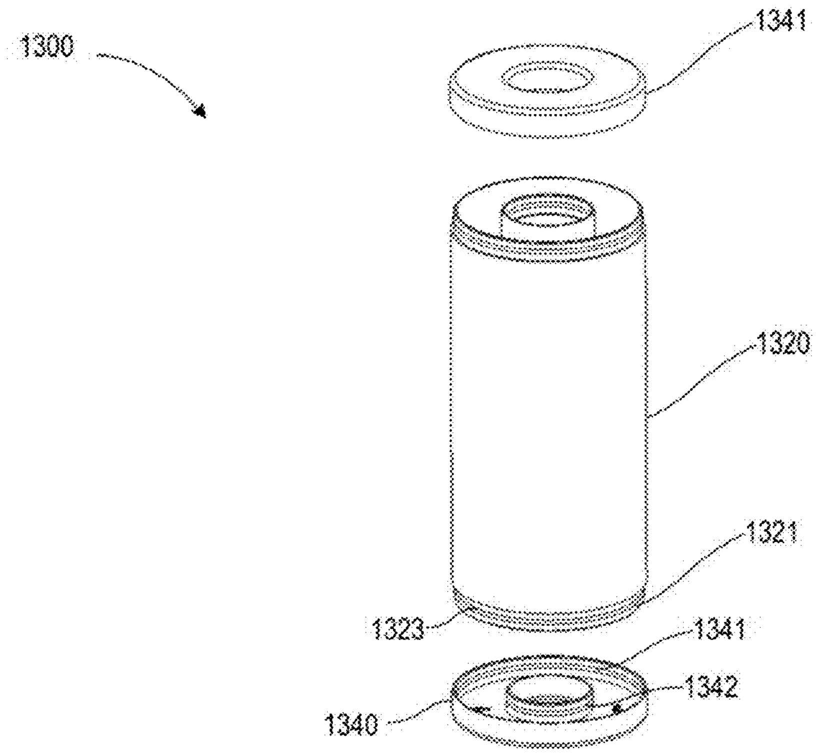
FIG. 19 shows a perspective view of a housing in the form of a hollow cylinder with two covers.

FIG. 19 shows a perspective view of a housing 1300. The housing 1300 has the shape of a hollow cylinder and is composed of a tubular trough 1320 and a first trough cover 1340, as well as a second trough cover 1341. With the exception of its basic shape, the trough 1320 is constructed identically to the trough 600 and the trough covers 1340 and 1341 are, except for the differing basic shape of the ring, constructed identically to the trough cover 140. As explained earlier with reference to the trough 600, the trough 1320 also has four circumferential depressions 1321 and 1322 with four circumferential ribs 1323 and 1324. The trough covers 1340 and 1341 have, as in the case of trough cover 140, circumferential grooves 1342 and 1341. When the trough 1320 and the trough covers 1340 and 1341 are assembled, the circumferential ribs 1323 and 1324 of the trough 1320 engage with the circumferential grooves 1342 and 1341 of the trough covers 1340 and 1341 and thereby positively connect the trough 1320 and the trough covers 1340 and 1341 to each other.

Figure 20:
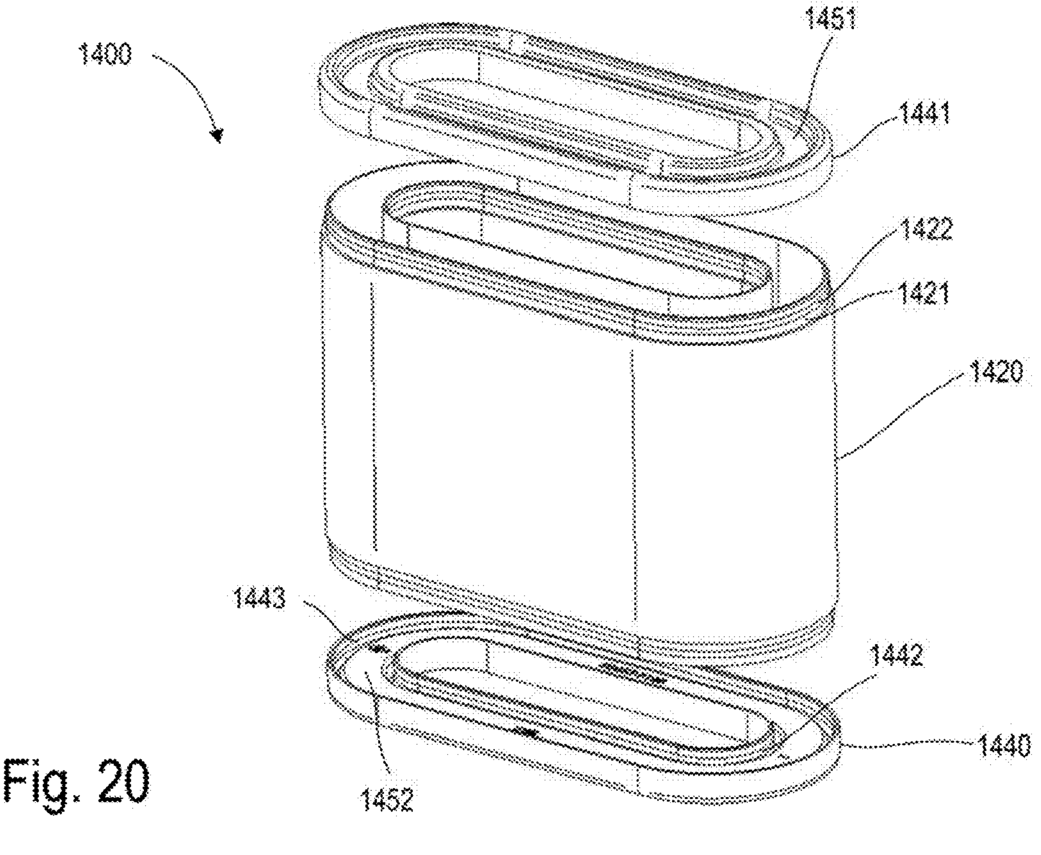
FIG. 20 shows a perspective view of a housing in the shape of a flattened ring comprising three housing parts.

FIG. 20 shows a perspective view of a housing 1400. The housing 1400 comprises a trough 1420, a first trough cover 1440 and a second trough cover 1441. The trough 1420 connects the trough covers 1440 and 1441 to each other. Just as the housing 1400, the trough 1420 and the trough covers 1440 and 1441 have the basic shape of a flattened ring and enclose one (or more) inner openings. Each of the trough covers 1440 and 1441 has a circumferential corrugation 1451 and 1452. As one example, each of the trough covers 1440 and 1441 can have numerous inner openings (not shown), which could be separated from each other using reinforcing struts (not shown).

As in the case of the troughs described above, the trough 1420 also has four circumferential depressions 1421 with four circumferential ribs 1422. The trough covers 1440 and 1441 also have corresponding circumferential grooves 1442 and 1443. When the trough 1420 and the trough covers 1440 and 1441 are assembled, the circumferential ribs 1422 of the trough 1420 engage with the circumferential grooves 1442 and 1443 of the trough covers 1440 and 1441, thereby positively connecting the trough 1420 and the trough covers 1440 and 1441 to each other.

Figure 21:
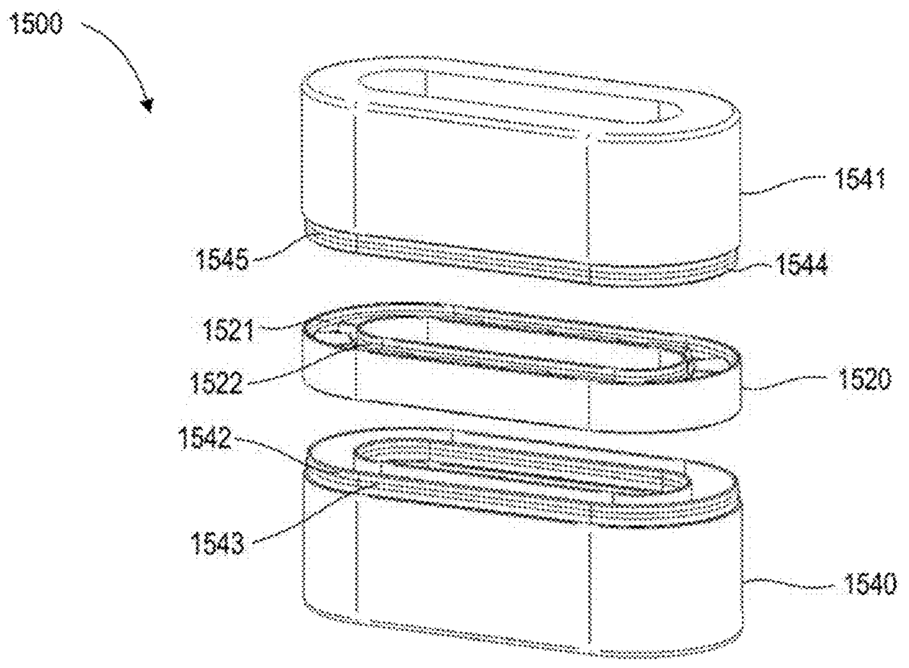
FIG. 21 shows a perspective view of an alternative to the housing shown in FIG. 20.

FIG. 21 shows a perspective view of a housing 1500. The housing 1500 comprises a trough cover 1520, a first trough 1540, and a second trough 1541. The trough cover 1520 connects the first trough 1540 to the second trough 1541, wherein the first trough 1540 is constructed identically to the second trough 1541. The trough cover 1520, the first trough 1540 and the second trough 1541 all have the basic shape of a round ring that encloses an inner opening. As one example, the inner opening in the first trough 1540 and the inner opening in the second trough 1541 could be divided up into numerous individual openings using reinforcing struts (not shown).

As in the case of the trough covers described above, the trough cover 1520 also has four circumferential grooves 1521 and 1522. The troughs 1540 and 1541 have, as in the case of the previously described troughs, circumferential depressions 1542 and 1544 with circumferential ribs 1543 and 1545. The form of the grooves 1521 and 1522 corresponds to the form of the ribs 1543 and 1545 so that, when the trough cover 1520 and the troughs 1540 and 1541 are assembled, the circumferential ribs 1543 and 1545 of the troughs 1540 and 1541 engage with the circumferential grooves 1521 and 1522 of the trough cover 1520, thereby positively connecting the trough cover 1520 to the trough covers 1540 and 1541.

Figure 22:
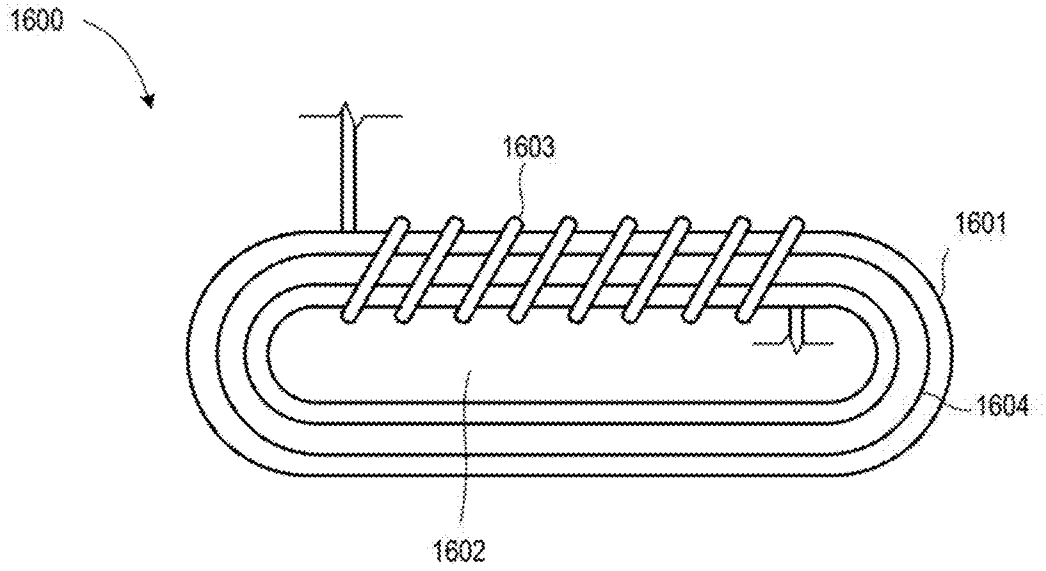
FIG. 22 shows a perspective view of a housing provided with a wire wounding.

FIG. 22 shows a view from above of an inductor 1600. The inductor 1600 includes a magnetic core (not shown) in a housing 1601 which has the basic shape of a flattened ring that encloses an inner ring opening 1602. The housing 1601 comprises a trough (not shown) and a trough cover 1603 with a corrugation 1604 that is positively connected to the trough and it is provided with a wound wire core 1605, wherein the housing 1600 is wound into one or more coils along its basic form and the wire coils also lead through the opening 1602.

In addition to the examples described here, in which the trough has one or more circumferential depressions, each of which has a circumferential rib, the trough cover can also have one or more depressions, each with a circumferential rib. The same applies for the previously described grooves. The troughs may also have grooves on the sides of the inner wall that face the opening and on the sides of the outer walls that face away from the opening. In the examples described here, both the ribs and the grooves have the form of a partial circular cylinder, divided lengthwise. Alternatively, the ribs and the grooves can have other mutually corresponding forms. For example, the ribs and the grooves may both have the form of an equilateral or scalene triangular prism or of a trapezoidal prism. In addition, the ribs and the grooves can be formed such that the grooves of the trough cover or trough covers snap fit onto the ribs of the trough or troughs.

The chambers of the housings in which the magnetic cores are disposed can be hermetically sealed off from the housing parts. In actual practice this is only to a limited extent possible, due to manufacturing tolerances. As a result of manufacturing tolerances, a tolerable gap may remain between two housing parts and, in particular, in the region of the grooves and ribs. In the case of a magnetic core composed of strip material, for example, a wound toroidal tape core that has a maximum thickness, the remaining gap may be smaller than this maximum thickness. Such a situation is shown in the previously discussed FIG. 4. In this example, there is a small gap with a gap width oft in the overlap regions 110, 111 between oppositely disposed surfaces of the internal and external walls 141, 142 of the cover 140 and corresponding walls 122, 123 of the trough 120 (see also FIGS. 2 and 3). Essentially, the trough 120 and cover 140 will actually contact each other along the circumferential ribs and grooves. Particles that might come off of a wound toroidal tape core disposed in the trough will (at least in one direction) not be larger than the thickness of the strips with which the toroidal tape core is wound. If the remaining gap is smaller than the maximum or nominal thickness of the wound strips, then it is relatively improbable that particles will escape the housing.

In actual practice, particles are always formed when cores wound with nanocrystalline strip material are used, as nanocrystalline strip material is relatively brittle. In order to comply with the requirements regarding the technical cleanliness of the products standardized in various regulations and guidelines (e.g. the guidelines regarding technical cleanliness in electrical engineering from the German Zentralverband Elektrotechnik- and Elektronikindustrie-ZVEI), the housing should ideally be sealed to prevent particles from escaping. If there is a gap in the overlap region between the housing parts (on both sides of the ribs and grooves), which is unavoidable when plastic housings are used in practice, that has a width t that is smaller than the thickness of the strip material with which the core is wound then, as mentioned above, it is very improbable that any particles that might come off the core will escape.

The housings described here can be wound with one or more coils, by means of which an inductive component, for example, a inductor or a transformer, can be manufactured from the magnetic assembly. The magnetic core enclosed in the housing can also be wound with one or more coils. The housing or of the magnetic core, of both, can be wound, for example, with a wire coil, wherein the wire can be an insulated or a non-insulated wire with any cross-section size and of any cross-section form. Examples of wire cross-sections include round and rectangular cross-sections. An example of an insulated wire is an enameled copper wire.

The housing parts described here can be detachably or non-detachably connected to each other. For example, at least two housing parts of any of the housings described here can be frictionally, interlockingly or positively connected to each other or by means of any desired combination of the aforementioned joining techniques. Examples of such joining techniques include clamping, adhesive and snap-in connections. The circumferential ribs and the circumferential grooves of the housing parts can also be glued or welded together.

A circumferential recess can be a seam or a ledge. The circumferential rib can also be implemented as a dovetail rail and the outer walls of the trough and the cover(s) may adjoin each other evenly (as shown in all of the examples here), or they may form a step (not shown). The housings and the housing parts described here, such as troughs and trough covers, can be manufactured, for example, of non-magnetic material such as, for example, plastic, or of molded parts that contain plastic and other components such as, for example, injection-molded parts or pressed parts. Virtually all technical plastics can be considered for the plastic material, including (but not limited to) polyamide (PA), polybutylene terephthalate (PBT), polycarbonate (PC), polyethylene terephthalate (PET), polymethyl methacrylate (PMMA), polyoxymethylene (POM) and acrylonitrile butadiene styrene (ABS). The plastics can also be combined with other materials, such a fiberglass materials, fire retardants or fillers. The material of the magnetic core can be a soft magnetic strip material. The soft magnetic strip material can be amorphous or nanocrystalline strip material, for example.

The housings described here prevent core splits or other undesired particles from becoming caught in the joint in the process of joining trough parts. This should be prevented, as these core splits can be sheared off in the further manufacturing process and wander freely about which, for numerous reasons, is undesirable. In addition to this, insulations of the coil wires or the wires themselves can be damaged if splits are wound over, causing, for example, short circuits. Further, gaps that might arise due to non-abutting joining surfaces of trough parts, for example, between the trough cover and the trough underside, are also avoided. This behavior can frequently be observed when plastic parts with straight flat surfaces are used such as in the case, for example, of non-circular troughs.

The housings described here reduce or eliminate the drawbacks described above due to the fact that the connection between trough cover and trough bottom part is disposed laterally on the open side of the trough cover and the trough bottom part. Trough cover and trough bottom part overlap circumferentially in a region of, for example, a few millimeters on the out and inner periphery of the construction and have a groove and tongue (rib) contour. The implementation as a groove and tongue mechanism seals the environment off against particles from the inner chamber of the trough and at the same time provides for a snap-in or otherwise realized fixation of the joined partners.

In addition to this, any mechanical stress caused by the winding is reduced or prevented by arranging the connection between the trough cover (covers) and the trough bottom part laterally on the open side of the trough cover and the trough bottom part. In this case, for example, the cover has a closed surface in the region of the cover end face (upper side) extending to the side surface (over the edge) which serves, for example, to absorb and distribute mechanical stress that arises, for example, during the winding of the coil and/or the winding process.

In order to counteract this, the force is introduced through the wound wire over the integral and closed edge, eliminating the possibility of gaps forming. In addition, the cover can have a depression or corrugation (alternatively, a protuberance), with the aid of which trough walls that fall inwards can be "formed" outwards and it can be ensured that the side walls of the trough will adjoin to the inner sides of the cover. In this manner, a depression or corrugation (or protuberance) in the cover is an element that prevents the trough walls from falling inwards and positions the trough walls towards their ideal vertical alignment while reinforcing the structure of the housing part such as, for example, that of the cover.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although various embodiments have been illustrated and described with respect to one or more specific implementations, alterations and/or modifications may be made to the illustrated examples without departing from the spirit and scope of the appended claims. With particular regard to the various functions performed by the above described components or structures (units, assemblies, devices, circuits, systems, etc.), the terms (including a reference to a "means") used to describe such components are intended to correspond—unless otherwise indicated—to any component or structure that performs the specified function of the described component (e.g., that is functionally equivalent), even if it is not structurally equivalent to the disclosed structure that performs the function in the herein illustrated exemplary implementations of the invention.

It will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A magnetic assembly, comprising:

a magnetic core made of soft magnetic material and a housing which encloses the magnetic core on all sides and which comprises two mutually joined housing parts, wherein the mutually joined housing parts comprise a circumferential overlap region extending around the magnetic core, within which one of the housing parts has a circumferential rib and the other housing pan has a corresponding circumferential groove with which the rib positively engages, wherein at least one of the housing parts comprises a circumferential corrugation or a circumferential depression.

2. An assembly in accordance with claim 1, in which the housing parts comprise plastic material or consist thereof.

3. An assembly in accordance with claim 1, in which the housing comprises a trough and a trough cover, wherein the trough cover is placed onto the trough, is inserted into the trough or is fitted over the trough.

4. An assembly in accordance with claim 3, in which the trough cover has a depression or a protuberance or both in the direction of a longitudinal axis of the trough.

5. An assembly in accordance with claim 1, in which the housing comprises further housing parts that are connected to the two housing parts and to each other.

6. An assembly in accordance with claim 5, in which the housing comprises, as housing parts, a duct and two trough covers that, at one end of the duct, are placed onto the duct or are inserted into the duct or are fitted over the duct, wherein circumferential overlap regions appear between the duct and each of the trough covers.

7. An assembly in accordance with claim 5, in which one of the trough covers has a depression or a protuberance or both in the direction of the longitudinal axis of the duct.

8. An assembly in accordance with claim 1, in which the housing comprises, as housing parts, two troughs that are aligned centered and facing each other and of which one is placed onto the other or of which one is inserted into the other or of which one is fitted over the other.

9. An assembly in accordance with claim 1, in which two or more of the housing parts are detachably connected to each other.

10. An assembly in accordance with claim 1, in which two or more of the housing parts are non-detachably connected to each other.

11. An assembly in accordance with claim 1, in which the magnetic core comprises soft magnetic material.

12. An assembly in accordance with claim 11, in which the soft magnetic material contains amorphous or nanocrystalline material.

13. An assembly in accordance with claim 1, in which the housing encloses one or more inner openings.

14. An assembly in accordance with claim 1, in which the housing is hermetically sealed.

15. An assembly in accordance with claim 1, in which the housing is wound with wire.

16. An assembly in accordance with claim 1, in which the rib and the groove have a snap-in mechanism to fixate one of the housing parts in the other housing part.

17. An assembly in accordance with claim 1, in which the rib and the groove are adhered to each other.

18. An assembly comprising the following:

a ring-shaped magnetic core and a ring-shaped housing that encloses the magnetic core on all sides and that comprises two mutually connected housing parts;

wherein each of the housing parts has a first circumferential overlap region extending around the magnetic core on the outside and a second circumferential overlap region extending along the magnetic core on the inside, wherein one of the housing parts has, both in the first overlap region, as well as in the second overlap region a circumferential rib, and the other housing part has a corresponding groove with which the rib positively engages, at least one of the housing parts comprises a circumferential corrugation or a circumferential depression.

19. An assembly in accordance with claim 18, wherein the ring-shaped magnetic core is wound with a soft magnetic strip material.

20. A magnetic assembly, comprising:

a magnetic core made of soft magnetic material and a housing which encloses the magnetic core on all sides and which comprises two mutually joined housing parts, wherein the mutually joined housing parts comprise a circumferential overlap region extending around the magnetic core, within which one of the housing parts has a circumferential rib and the other housing part has a corresponding circumferential groove with which the rib positively engages, wherein the housing comprises, as housing parts, two troughs and a double trough cover that comprises two ends, wherein a first end of the two ends of the double trough cover is placed onto a first trough of the two troughs or is inserted into the first trough or is fitted over the first trough, wherein a second end of the two ends of the double trough cover is placed onto a second trough of the two troughs or is inserted into the second trough or is fitted over the second trough, wherein circumferential overlap regions appear between the double trough cover and each of the troughs, wherein the magnetic core comprises a first magnetic core and a second magnetic core, wherein the circumferential overlap regions extend around the first and the second magnetic core, respectively.

21. A magnetic assembly, comprising:

a magnetic core made of soft magnetic material and a housing which encloses the magnetic core on all sides and which comprises two mutually joined housing parts, wherein the mutually joined housing parts comprise a circumferential overlap region extending around the magnetic core, within which one of the housing parts has a circumferential rib and the other housing pan has a corresponding circumferential groove with which the rib positively engages, wherein the housing comprises, as housing parts, a double trough and two trough covers that, at respective ends of the double trough, are placed onto the double trough or are inserted into the double trough or are fitted over the double trough, wherein circumferential overlap regions appear between the double trough and each of the trough covers, wherein the magnetic core comprises a first magnetic core and a second magnetic core, wherein the circumferential overlap regions extend around the first and the second magnetic core, respectively.

22. An assembly in accordance with claim 1, wherein a gap remains in the overlap region where the rib engages the groove, and the gap is smaller than a maximum strip thickness of a strip material of the magnetic core.

23. An assembly in accordance with claim 1, wherein the housing has a non-round shape.

24. An assembly in accordance with claim 1, wherein the housing has the shape of a rectangular ring or of an oval.

25. An assembly in accordance with claim 18, wherein a gap remains in the first and in the second overlap region where the ribs engage with the corresponding grooves, and the gap is smaller than a maximum strip thickness of a strip material of the magnetic core.

26. An assembly in accordance with claim 18, wherein the housing has a non-round shape.

27. An assembly in accordance with claim 18, wherein the housing has the shape of a rectangular ring or of an oval.

* * * * *